(12) United States Patent
Buriano et al.

(10) Patent No.: US 7,761,592 B2
(45) Date of Patent: Jul. 20, 2010

(54) METHOD OF MANAGING A CONGESTION STATE IN A SERVER OF A COMMUNICATION NETWORK

(75) Inventors: Luca Buriano, Turin (IT); Roberta Maglione, Turin (IT)

(73) Assignee: Telecom Italia S.p.A., Milan (IT)

( * ) Notice: Subject to any disclaimer, the term of this patent is extended or adjusted under 35 U.S.C. 154(b) by 308 days.

(21) Appl. No.: 11/884,539

(22) PCT Filed: Feb. 28, 2005

(86) PCT No.: PCT/EP2005/050854

§ 371 (c)(1),
(2), (4) Date: Aug. 17, 2007

(87) PCT Pub. No.: WO2006/089591

PCT Pub. Date: Aug. 31, 2006

(65) Prior Publication Data

US 2008/0147879 A1      Jun. 19, 2008

(51) Int. Cl.
*G06F 15/173* (2006.01)
(52) U.S. Cl. .................. 709/235; 709/233; 709/234; 709/236; 711/114
(58) Field of Classification Search .......... 709/233–236
See application file for complete search history.

(56) References Cited

U.S. PATENT DOCUMENTS 6,724,722 B1 *  4/2004  Wang et al. ................. 370/229

7,508,763 B2 *  3/2009  Lee ............................. 370/235
2001/0029545 A1 * 10/2001  Takahashi et al. ........... 709/234

(Continued)

FOREIGN PATENT DOCUMENTS

WO    WO-2004/068770 A2    8/2004

OTHER PUBLICATIONS

Sang-Hee Han; Sang-Sik Kim; Sang-Ha Kim; "A Framework for Selecting Appropriate Content Delivery Server Considering Round-Trip Time and Actual Serving Callings", The 2004 Joint Conference fo the 10th Asia-Pacific Conference on Communications and 5th International Symposim on Multi-Dimensional Mobile Communications, vol. 1, Aug. 29-Sep. 1, 2004, p. 244-248.*

(Continued)

*Primary Examiner*—Wing F Chan
*Assistant Examiner*—Razu A Miah
(74) *Attorney, Agent, or Firm*—Finnegan, Henderson, Farabow, Garrett & Dunner, L.L.P.

(57) ABSTRACT

A method of managing a congestion state in a server of a communication network is provided. The server includes a buffer storing a first number of service requests and having a maximum storage capacity. The method includes: in a first time frame, receiving a further service request to be stored in the buffer and determining whether to store such a further service request in the buffer or to refuse it; and, in a second time frame, deleting a second number of service requests stored in the buffer. The step of determining whether to store the further service request in the buffer or to refuse it includes refusing the further request according to a refusal probability if the first number is lower than the maximum storage capacity.

25 Claims, 8 Drawing Sheets

U.S. PATENT DOCUMENTS

2003/0223366 A1* 12/2003 Jeffries et al. ............... 370/231
2005/0210098 A1* 9/2005 Nakamichi et al. .......... 709/203
2005/0263588 A1* 12/2005 Babi et al. .................. 235/380

OTHER PUBLICATIONS

S. Floyd "Random Early Detection Gateways for Congestion Avoidance", IEEE/ACM Transactions on Networking, pp. 1-29, (1993).

Rosenburg et al.; "SIP: Session Initiation Protocol"; RFC 3261, pp. 1-269, (Jun. 2002).

Braden et al.; "Recommendations on Queue Management and Congestion Avoidance in the Internet"; IETF RFC 2309, pp. 1-17, (Apr. 1998).

* cited by examiner

METHOD OF MANAGING A CONGESTION STATE IN A SERVER OF A COMMUNICATION NETWORK

CROSS REFERENCE TO RELATED APPLICATION

This application is a national phase application based on PCT/EP2005/050854, filed Feb. 28, 2005, the content of which is incorporated herein by reference.

BACKGROUND OF THE INVENTION

1. Field of the Invention

The present invention relates to management of a server of a communication network. In particular, it relates to a method of managing a congestion state in a server, as well as a related computer program product. The present invention further relates to a server for implementing such a method.

2. Description of the Related Art

As it is known, in a packet-switched communication network information to be transmitted is divided into packets. Each packet is transmitted through the network independently from the other packets. At the receiver side, information is recovered by reconstructing the correct sequence of packets. In a packet-switched communication network, servers are provided for receiving and serving incoming service requests from a plurality of users. Different types of servers are known, each type of server being adapted to provide a set of services.

For instance, an FTP server is adapted to serve requests of users wishing to forward a file to a receiving user through a proper protocol, termed File Transfer Protocol. Besides, a SIP proxy server is adapted to serve requests of users wishing to set up a vocal session with a called user through a proper protocol, termed Session Initiation Protocol. For a detailed description of SIP protocol, reference can be made to IETF RFC 3261 "Session Initiation Protocol" by J. Rosenberg, June 2002.

Each service request contains service information allowing the server to provide the required service. For instance, a request of sending a file may contain the sending user address and the receiving user address. Besides, a request of setting up a vocal session may contain the caller user identifier and the called user identifier.

Each server has a buffer, i.e. a memory device where requests to be served are stored. In particular, when a server accepts an incoming request, it allocates a respective memory portion of said buffer. Said memory portion is adapted to store request service information and request status information. Once a request is served, the server deletes, the request from the buffer, i.e. it de-allocates the corresponding memory portion, which becomes available for storing further requests.

A server can perform allocation and de-allocation of memory portions in a substantially continuous manner. Alternatively, servers are known which perform allocation and de-allocation in different time frames. In the following description, a server performing continuous allocation and de-allocation will be referred to as "single-phase server". Besides, a server performing allocation and de-allocation in different time frames will be referred to as "two-phase server".

A single-phase server continuously checks for new incoming requests and, at the same time, checks the buffer for already served requests. Hence, in any check instant, a single-phase server allocates memory portions for new incoming requests, and it de-allocates memory portions associated to already served requests. Thus, in a single-phase server, at each check instant, a filling level of the buffer (i.e. the number of requests stored into the buffer) may be either increasing or decreasing.

On the other hand, in a two-phase server, allocation and de-allocation steps are performed in two separated time frames, which temporally alternate in a cyclic way. During a first time frame (also referred to as "allocation time frame"), the server only checks for new incoming requests, and allocates respective memory portions. During a second time frame (also referred to as "de-allocation time frame"), which is generally shorter than the first time frame, the server only checks whether the buffer contains already served requests, and, in the affirmative, the server de-allocates the respective memory portions. Thus, in a two-phase server, the filling level of the buffer is non-decreasing during the allocation time frame, while it is non-increasing during the de-allocation time frame.

Typically, FTP servers continuously manage the service requests and thus are single-phase servers. The continuous management of the requests is deemed to be advantageous since it is generally possible to estimate in advance a request service period, i.e. the time for serving a request of sending a file through the File Transfer Protocol. Thus, it is possible to provide a check instant for each service period; in this way, memory portions are de-allocated as soon as possible, thus resulting in a very efficient request management.

Typically, SIP proxy servers are two-phase servers. In a SIP proxy server, indeed, it is not possible to estimate in advance a service period, since it depends on the time required by the called user to answer the call. This period is almost unpredictable. Consequently, a single-phase management would require to continuously check the buffer for already served requests. However, this would require a large amount of computation resources, thus reducing the computation resources available for serving the requests.

Generally speaking, storage capacity of a server buffer is limited. Thus, the maximum number of requests which can be contemporarily served by a server is limited by the storage capacity of its buffer. When the overall number of incoming requests exceeds the buffer storage capacity, the server experiences a congestion state.

When a server is in a congestion state, it must determine whether to accept or to refuse an incoming request. In the following description, the term "management of a congestion" or similar expressions, will refer to the rules upon which a server in a congestion state decides whether to accept of refuse an incoming request.

Two methods of managing a congestion of a server are known in the art.

A first method, which is known as "tail drop", consists in accepting all the incoming requests until the buffer is saturated, i.e. completely filled. Once the buffer is saturated, any further incoming request is refused. The server accepts a new incoming request only when the buffer filling level has decreased and at least a memory portion has become available. For a detailed description of the "tail drop" technique reference can be made to IETF RFC 2309 "Recommendations on Queue Management and Congestion Avoidance in the Internet", April 1998.

Advantageously, this method allows a server to use always the whole buffer. Moreover, advantageously, the tail drop method may be applied both to single-phase servers and to two-phase servers. However, saturation of the buffer results in some disadvantages. When a new incoming request arrives to the server, said request will be refused until a memory portion is de-allocated. This means that, when the server is in a congestion state, the delay in serving requests is not equally shared between all the users connected to the server, but it affects only the users trying to send a request when the buffer is saturated. Such a behaviour leads to synchronization between users trying to send a request, thus increasing the severity of the congestion state.

To avoid the above drawbacks, a second method for managing a congestion has been proposed in the art by S. Floyd and V. Jacobson in their article "Random Early Detection Gateways for Congestion Avoidance", IEEE/ACM Transactions on Networking, August 1993. This method is known as "random early detection" or RED. According to the RED method, the incoming requests are organized in a queue. The server detects incipient congestion by computing an average queue size. The average queue size is compared with two preset thresholds, a minimum threshold and a maximum threshold. When the average queue size is lower than the minimum threshold, no request is dropped (i.e. refused). When the average queue size exceeds the preset minimum threshold, the server drops any incoming request with a certain probability, where the probability is a function of the average queue size. This ensures that the average queue size does not significantly exceed the maximum threshold. Estimating the average queue size and the probability requires a set of parameters, such as:

minimum threshold of the queue;
maximum threshold of the queue;
queue weight;
maximum value for dropping probability; and
number of requests that could have been served by the server during an idle period, where an idle period is a period wherein the queue is empty.

Therefore, the RED method allows to equally share the delay in serving requests between all the users connected to the server. Moreover, since the RED method aims to keep the queue length below a maximum threshold, synchronization effects are avoided, and bursts of requests can be managed.

However, the RED method exhibits some disadvantages. Firstly, estimating the probability of refusing a request requires five parameters, which must be manually adjusted by a server manager. Thus, the server manager must periodically check the status of the server and adjust said parameters, if needed. Moreover, the RED method can not be applied to a two-phase server, for the following reasons. First of all, the requests are organised in a queue; queues are managed according to a FIFO logic (First-In-First-Out), so they are incompatible with a two-phase management. Moreover, the average queue size is a variable parameter which must be estimated substantially continuously; such estimation could be performed in a single-phase server but it is rather ineffective for a two-phase server, such as a SIP proxy server.

SUMMARY OF THE INVENTION

The Applicant has perceived the need of providing a method for managing a congestion state in a two-phase server which allows to share, substantially equally, the delay in serving requests of users connected to said server.

The Applicant has also perceived the need of providing a method for managing a congestion state in a two-phase server which prevents synchronization between users and which allows to manage request bursts.

The Applicant has also perceived the need of providing a method for managing a congestion state in a two-phase server which requires a rather simple algorithm and a small number of parameters to be manually set.

According to the present invention, a method is provided for managing a congestion state in a two-phase server, wherein, in a first time frame, if the buffer is saturated, new incoming requests are refused, and if the buffer is not saturated, new incoming requests are refused according to a refusal probability. Memory portions are allocated into the buffer for the accepted requests. During a second time frame, the server de-allocates memory portions associated to already served requests. The refusal probability is related to a congestion severity coefficient.

The invention also relates to a corresponding server for a communication network, as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

According to one embodiment, the refusal probability is calculated at a predetermined instant of either the first time frame or the second time frame.

According to one embodiment, the refusal probability is calculated at a starting instant of the first time frame. As an alternative, the refusal probability is calculated at an end instant of the first time frame.

According to another embodiment, a further refusal probability is calculated upon receiving a further service request. In this case, the further service request is refused according to the further refusal probability if the further refusal probability is higher than the refusal probability.

Preferably, determining whether to store the further service request in the buffer or to refuse it comprises generating a substantially random variable having a substantially uniform probability density within a range [0, 1] and comparing the substantially random variable with the refusal probability.

According to a second aspect, the present invention provides a server of a communication network. The server comprises a buffer storing a first number of service requests and having a maximum storage capacity. The server is adapted to: in a first time frame, receive a further service request to be stored in the buffer and determine whether to store such a further service request in the buffer or to refuse it; and in a second time frame, delete a second number of service requests stored in the buffer. The server is also adapted to store the further service request in the buffer or to refuse it according to a refusal probability if the first number is lower than the maximum storage capacity.

According to a preferred embodiment, said server comprises a Session Initiation Protocol proxy server.

According to a third aspect, the present invention provides a communication network comprising a server as set forth above.

According to the present invention, saturation of the buffer is avoided, as incoming requests are refused according to a refusal probability. Synchronization effects are also avoided, and the delay in serving requests is equally shared between users.

BRIEF DESCRIPTION OF THE DRAWINGS

Further features and advantages of the present invention will become clear by the following detailed description, given by way of non-limiting example, to be read with reference to the accompanying drawings, wherein:

FIG. 5a shows a flow chart of the method according to the first embodiment of the present invention shown in FIG. 4a;

DETAILED DESCRIPTION OF THE INVENTION

Figure 1:
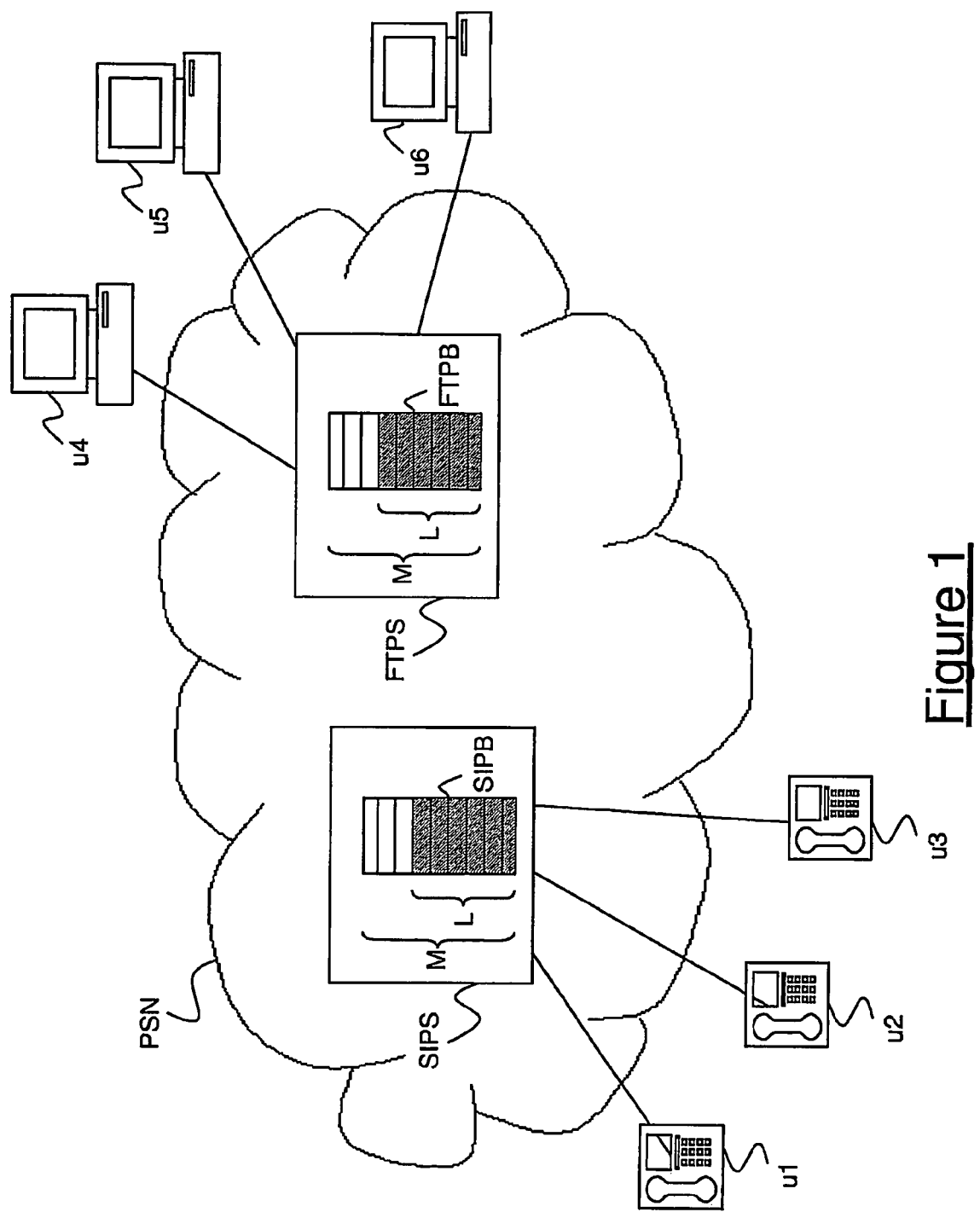
FIG. 1 schematically shows a packet-switched communication network.

FIG. 1 schematically shows a packet-switched network PSN. The network PSN generally comprises network elements, which are adapted to switch and route packets travelling across the network. Typically, among network elements, a network comprises a plurality of servers. For simplicity, the network PSN of FIG. 1 only comprises a SIP proxy server SIPS and an FTP server FTPS. The server SIPS is connected to a first plurality of users. For simplicity, FIG. 1 only shows three users u1, u2, u3. Each of said users u1, u2, u3 is provided with a proper user equipment interfacing with a SIP proxy server; for instance, each user u1, u2, u3 may be provided with an IP Phone. In turn, the server FTPS is connected to a second plurality of users; for instance, FIG. 1 shows three users u4, u5, u6. Each of said users u4, u5, u6 is provided with a proper user equipment which is designed for interfacing with an FTP server; for instance, each user u4, u5, u6 may be provided with a personal computer.

As mentioned above, users u1, u2, u3 may send to the server SIPS requests of setting up a vocal session with a called user. Similarly, users u4, u5, u6 may send to the server FTPS requests of sending a file to a receiving user. Thus, the server SIPS has a buffer SIPB, which is adapted to store requests coming from users u1, u2, u3. Similarly, the server FTPS has a buffer FTPB, which is adapted to store requests coming from users u4, u5, u6.

As mentioned above, the buffer of each server has a limited storage capacity M, which corresponds to the maximum number of requests that the server can serve at a same time. In the following description, "M" will refer to the buffer storage capacity, while "L(t)" will refer to a buffer filling level at a time t, i.e. to the number of requests stored into the buffer at the time t.

Figure 2B:
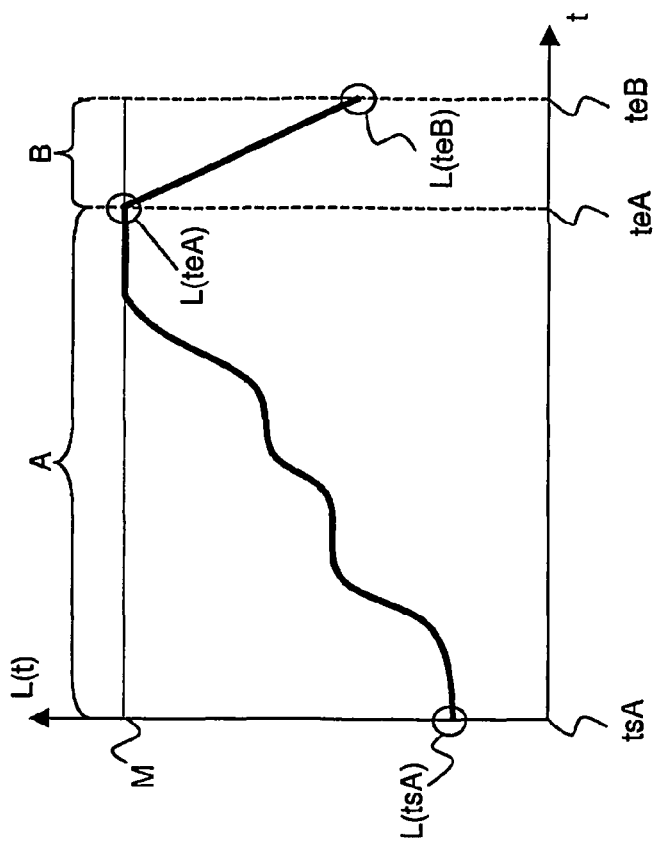
FIGS. 2a and 2b schematically show a time diagram of the buffer filling level for a single-phase server and for a double-phase server, respectively.
Figure 2A:
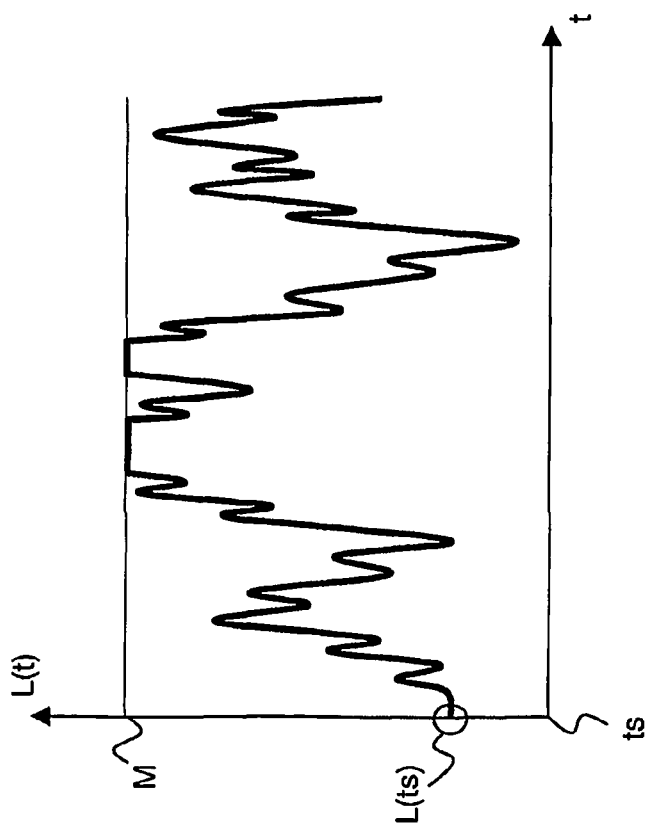

As mentioned above, a server may allocate and de-allocate memory portions of the buffer in different ways. In this respect, single-phase servers and two-phase servers are known in the art. FIGS. 2a and 2b show the time diagram of buffer filling level L(t) for a single-phase server and for a two-phase server, respectively.

In particular, FIG. 2a shows L(t) for a single-phase server, starting from a reference instant ts. At ts, the buffer contains L(ts) requests. Then, at predetermined check instants, the server continuously checks for new incoming requests and for already served requests. Thus, at each check instant, the single-phase server allocates memory portions for the new incoming requests and de-allocates memory portions corresponding to already served requests. L(t) consequently exhibits oscillations corresponding to the allocation and de-allocation of memory portions of the buffer. It must be noticed that L(t) is upwardly limited by the buffer storage capacity M.

FIG. 2b shows L(t) for a two-phase server. It can be identified an allocation time frame A, starting at instant tsA and ending at instant teA. During time frame A, the two-phase server only decides, for each new incoming request, whether to accept or refuse it. Thus, during time frame A, memory portions may be allocated, thus resulting in a non-decreasing behaviour of L(t). It must be noticed that L(t) is still upwardly limited by M.

A de-allocation time frame B starts at teA and ends at instant teB. During time frame B, the server deletes from the buffer already served requests, i.e. it de-allocates memory portions corresponding to said already served requests. Thus, during time frame B, L(t) is non-Increasing.

It must be noticed that FIG. 2b only shows one period of a two-phase server operation. Nevertheless, the above described time frames A and B temporally alternate each other in a cyclic way.

Furthermore, it should be remarked that the duration of time frames A and B is not in scale in FIG. 2b. Typically, the duration of time frame A is as high as some seconds whilst the duration of time frame B is of some milliseconds.

As mentioned above, when the number of incoming requests exceeds the buffer storage capacity M of a server, the server enters a congestion state.

The present invention provides a novel method for managing a congestion state in a two-phase server. Thus, the method according to the present invention provides an allocation time frame, wherein the server receives a plurality of requests from a plurality of users. For each incoming request, the server decides whether to accept it. If the buffer filling level is equal to the buffer storage capacity, the incoming request is refused. If the buffer filling level is lower than the buffer storage capacity, the request is refused according to a refusal probability. During a de-allocation time frame, the server deletes from the buffer already served requests.

In the following description, L"(t) will indicate the number of requests that would be stored into the buffer if all the incoming requests were accepted and the buffer had unlimited storage capacity. Further, L'(t) will refer to the number of requests that would be stored into the buffer if the buffer had unlimited storage capacity. Further, K(B) will indicate the number of deleted requests during the de-allocation time frame B.

It must be noticed that both L"(t) and L'(t) evolve during the allocation time frame A according to their respective definitions, while during the de-allocation time frame B, both L"(t) and L'(t) remain unchanged. They keep their respective values constant also at tsA, the starting time of the next frame A. Immediately after tsA, both L"(t) and L'(t) are reset to the value L(tsA), and they start their evolution again. According to the present invention, the refusal probability Pr may be estimated as a mathematical expression (e.g. sums, ratios and differences) involving a subset of the following quantities: M, tsA, teA, teB, L(t), L(tsA), L(teA), L(teB), L'(t), L'(tsA), L'(teA), L'(teB), L"(t), L" (tsA), L" (teA), L"(teB), t, TA (the duration of the allocation time frame A), TB (the duration of the de-allocation time frame B), and K(B). In particular, according to a preferred embodiment of the present invention, the refusal probability is related to a severity congestion coefficient. For example, as L(t), L'(t) and L"(t) are non-decreasing parameters during the allocation time frame A, such a severity congestion coefficient may be defined as the ratio between the number of incoming requests exceeding the buffer storage capacity M, which is equal to L"(t)−M, and the total number of incoming requests, which is equal to L"(t)−L(tsA).

Figure 3:
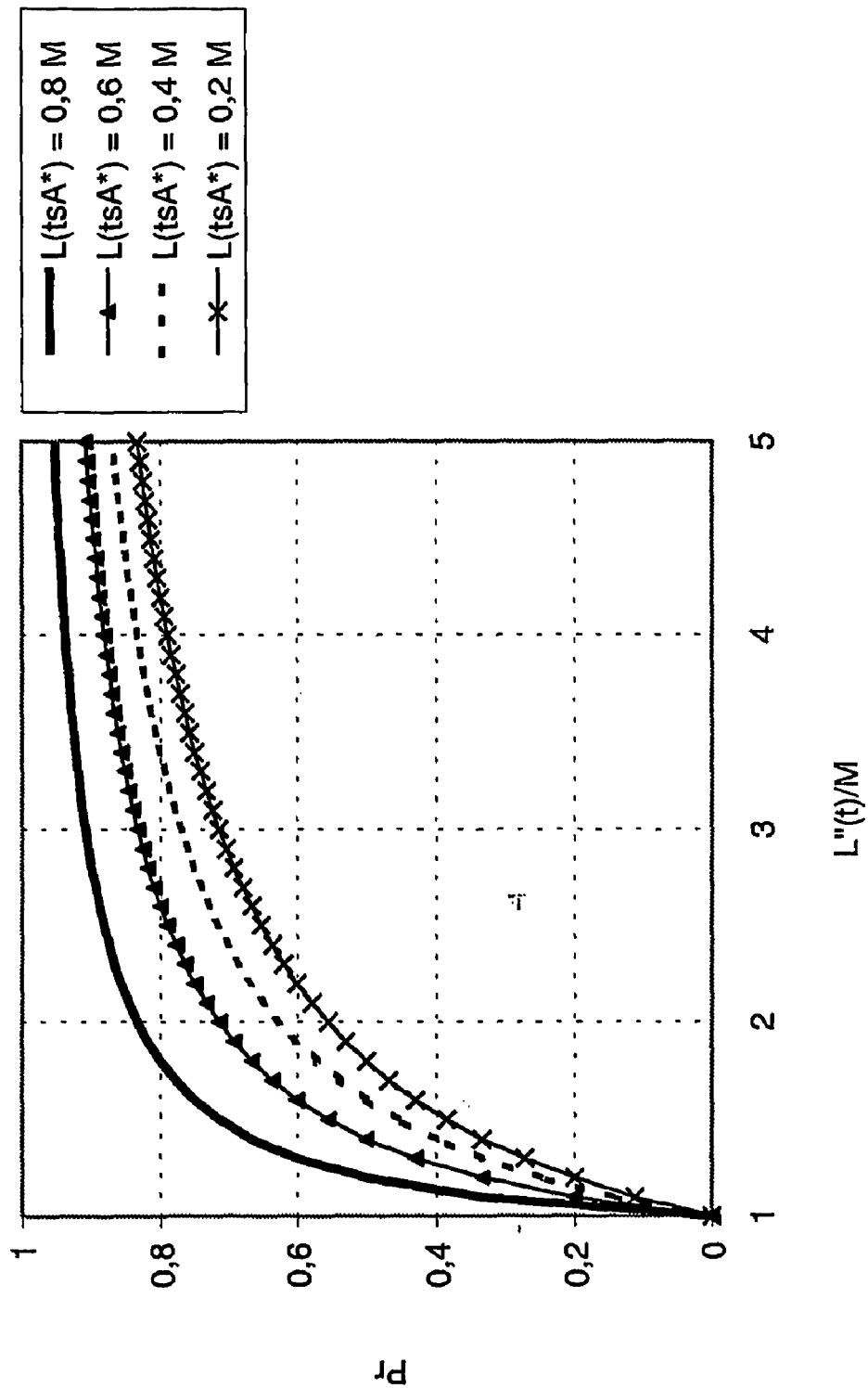
FIG. 3 shows an example of the refusal probability as a function of the overall number of incoming requests with four different values of the buffer filling level, according to the present invention.

In a first embodiment of the present invention, the refusal probability Pr may be equal to said congestion severity coefficient. FIG. 3 shows the refusal probability Pr as a function of L"(t), where Pr is expressed by the following formula:

$$Pr = \frac{L''(t) - M}{L''(t) - L(tsA^*)}, \qquad (1)$$

where tsA* is equal to the last tsA such as tsA≦t. In the case the numerator of (1) is less than 0, or the denominator of (1) is equal to 0 or less than 0, then Pr=0.

In FIG. 3, L"(t) is comprised between M and 5M. The estimation of Pr has been performed for different values of the buffer filling level; in particular, FIG. 3 shows the curves corresponding to the cases wherein L(tsA*) is equal to 0,8 M, 0,6 M, 0,4 M and 0,2 M respectively. It can be noticed that at a given buffer filling level, increasing L"(t), i.e. the level reached by incoming requests, raises the refusal probability Pr, since the congestion state becomes more severe. Besides, for a given L"(t), increasing L(tsA*) increases the refusal probability Pr, since the congestion state becomes more severe.

Figure 4A:
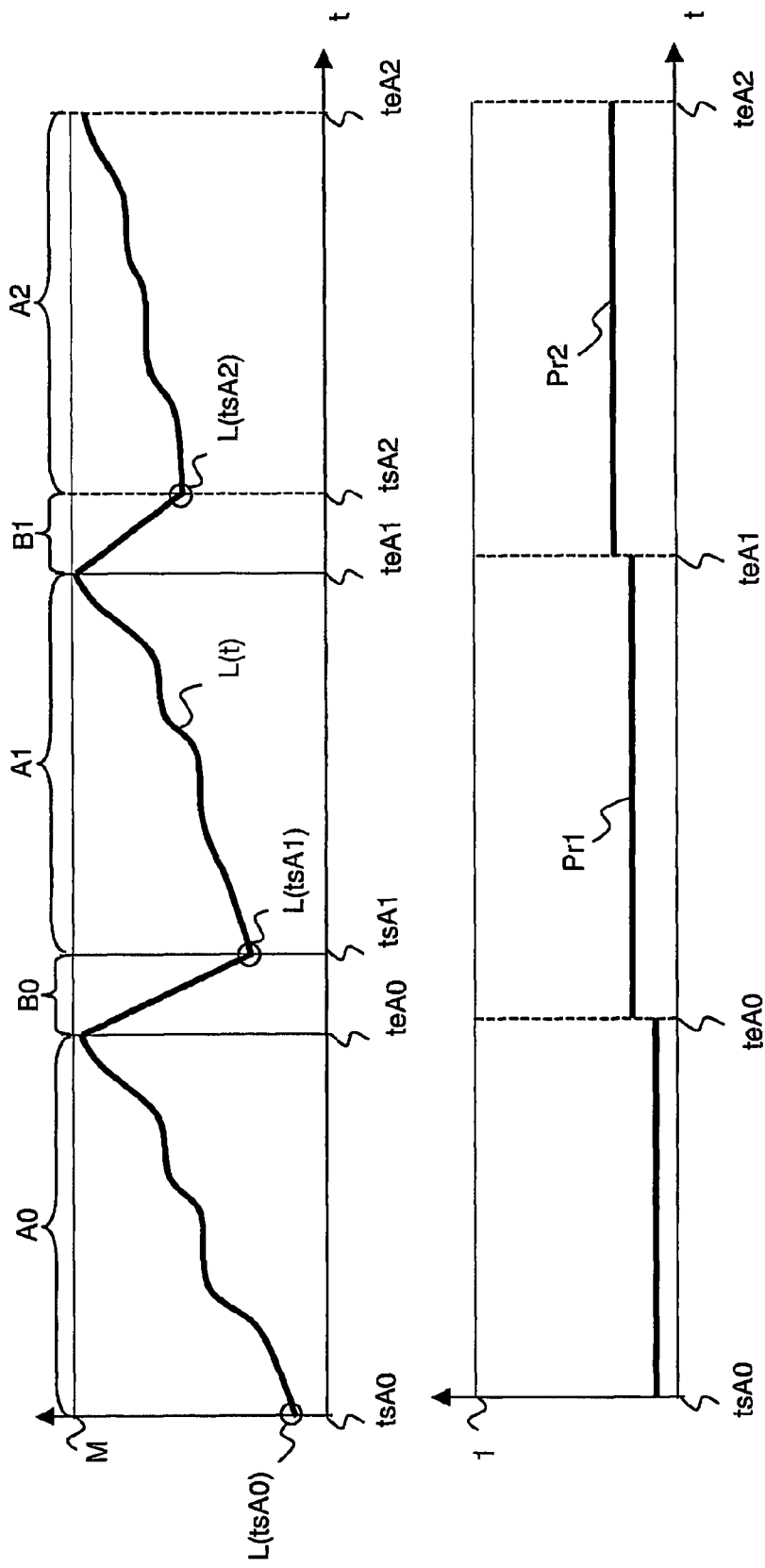
FIGS. 4a and 4b are time diagrams for illustrating a first and a second embodiments, respectively, of the method according to the present invention.

As mentioned above, according to the present invention, the refusal probability Pr may be estimated in a preset instant either of allocation time frame A or of de-allocation time frame B. FIG. 4a shows a first embodiment of the present invention, wherein the refusal probability to be applied in each allocation time frame is estimated at the end of the previous allocation time frame.

FIG. 4a shows an allocation time frame A0 beginning at an instant tsA0 and ending at an instant teA0. A de-allocation time frame B0 begins at instant teA0 and ends at instant tsA1. An allocation frame A1 begins at instant tsA1 and ends at instant teA1. A de-allocation time frame B1 begins at instant teA1 and ends at instant tsA2. Finally, a further allocation time frame A2 begins at instant tsA2 and ends at Instant teA2.

It can be noticed that during the time frame A1, each Incoming request is refused according to a refusal probability Pr1. Said refusal probability Pr1 is estimated at the end of the allocation time frame A0, i.e. at teA0, through the following formula:

$$Pr1 = \frac{L''(teA0) - M}{L''(teA0) - L(tsA0)}. \qquad (2)$$

Thus, during allocation time frame A1, L(t) is non-decreasing, as shown in FIG. 4a. During de-allocation time frame B1, a number of already served requests is deleted from the buffer. Thus, during de-allocation time frame B1, L(t) shrinks to the value L(tsA2).

At the instant teA1, a new refusal probability Pr2 is estimated; such a new refusal probability Pr2 will be applied to all the requests reaching the server during the time frame A2. Pr2 is expressed through the following formula:

$$Pr2 = \frac{L''(teA1) - M}{L''(teA1) - L(tsA1)}. \qquad (3)$$

Under the assumption that L"(teA0) is equal to L"(teA1), it can be noticed that, since the buffer filling level at the beginning of allocation time frame A1 is higher than the buffer filling level at the beginning of previous allocation time frame A0, the refusal probability Pr2 during the allocation time frame A2 is higher than the refusal probability Pr1 during the previous allocation time frame A1, as a higher buffer filling level indicates a more severe congestion state. Thus, during allocation time frame A2, L(t) increases, but more slowly than during previous allocation time frame A1. On the contrary, if at the beginning of allocation time frame A1, the buffer filling level had been lower than it was at the beginning of further allocation time frame A0, Pr2 would have been lower than Pr1, as the congestion state would have been less severe, and the server would have been able to accept a higher number of requests.

Figure 4B:
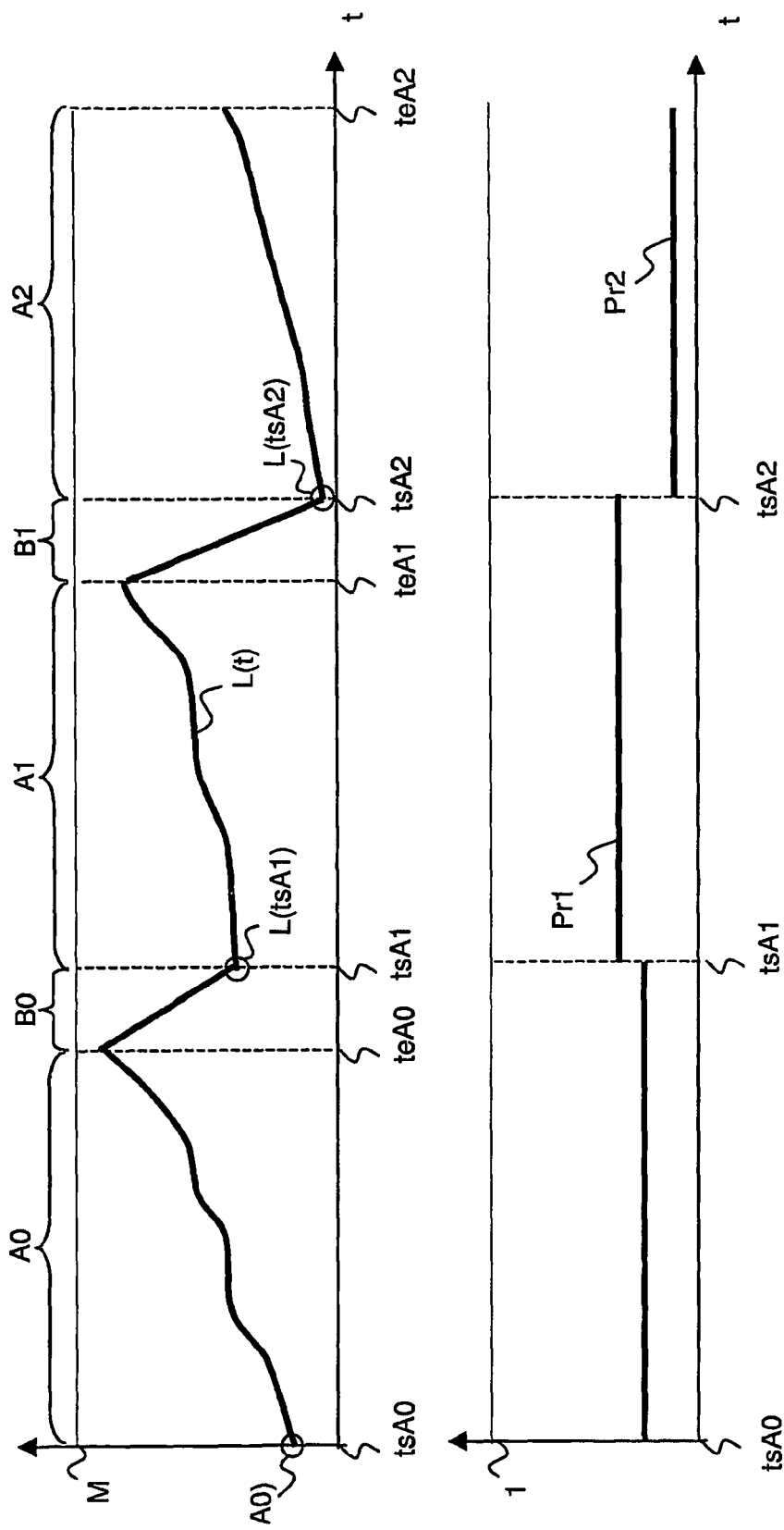

FIG. 4b shows a second embodiment of the present invention, wherein the refusal probability Pr is expressed by the following formula:

$$Pr = \frac{L''(t) - M + L(t) - L(tsA^*)}{L''(t) - L(tsA^*)}, \qquad (4)$$

where tsA* is equal to the last tsA such as tsA<t. In the case the numerator of (4) is less than 0, or the denominator of (4) is equal to 0 or less than 0, then Pr=0.

Thus, in this second embodiment, the refusal probability Pr to be applied in each allocation time frame is estimated at the beginning of allocation time frame itself.

With respect to the first embodiment, this second embodiment follows more timely the changes occurring in the buffer filling level L(tsA) from the start of an allocation frame A to the start of the next allocation frame, taking into account both the raise in L(t) during the previous frame A and the reduction of L(t) due to the deletion of some requests from the buffer during the previous frame B. This results in a more reactive behaviour in the updating of Pr, while the first embodiment has a more conservative behaviour.

For example, according to the second embodiment shown in FIG. 4b, the refusal probability Pr1 to be applied during the allocation time frame A1 is estimated at the instant tsA1 and expressed through the following formula:

$$Pr1 = \frac{L''(tsA1) - M + L(tsA1) - L(tsA0)}{L''(tsA1) - L(tsA0)}. \qquad (5)$$

Similarly, the refusal probability Pr2 to be applied during the allocation frame A2 is estimated at the instant tsA2 though the following formula:

$$Pr2 = \frac{L''(tsA2) - M + L(tsA2) - L(tsA1)}{L''(tsA2) - L(tsA1)}. \qquad (6)$$

It can be noticed that the Pr2 calculated according to (6) is lower than the corresponding Pr2 calculated according to (3), because L(tsA2) is lower than L(tsA1) and consequently the term L(tsA2)−L(tsA1) is lower than 0. This reflects the fact that, as shown in FIG. 4b, many requests have been cancelled from the buffer during the previous frame B, making the congestion status of the server less severe.

Figure 5A:
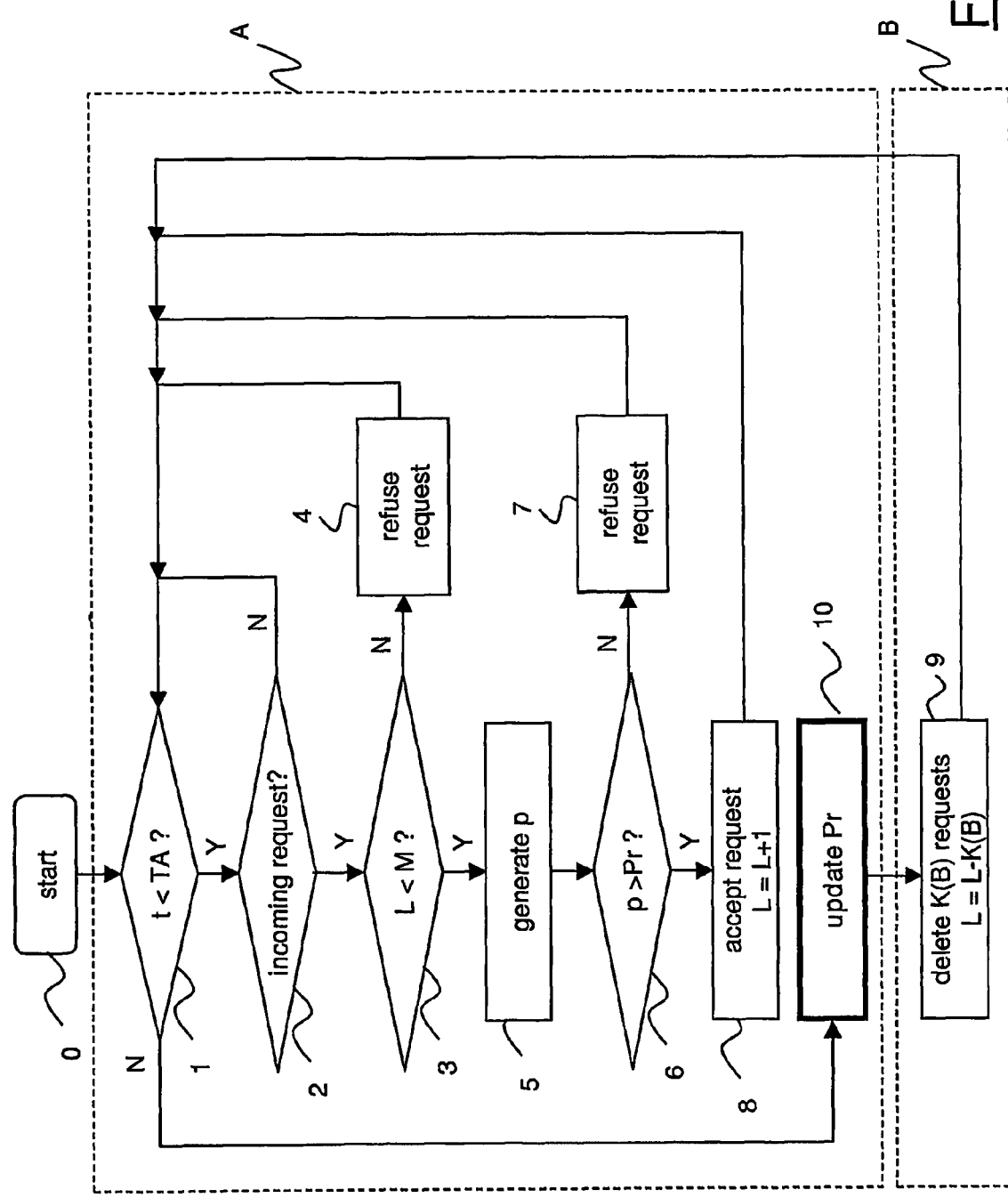
Figure 5B:
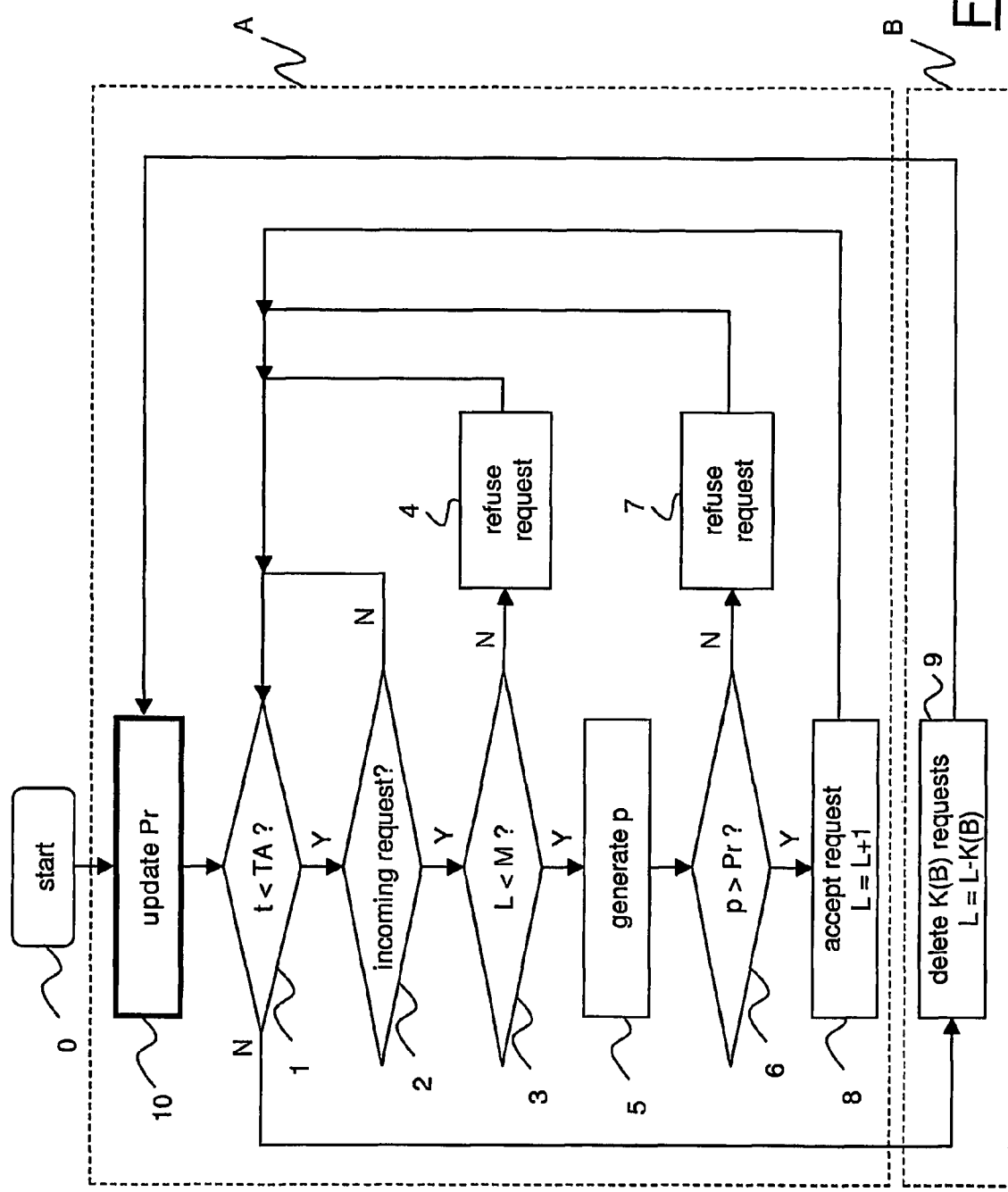
FIG. 5b shows a flow chart of the method according to the second embodiment of the present invention shown in FIG. 4b.
Figure 5C:
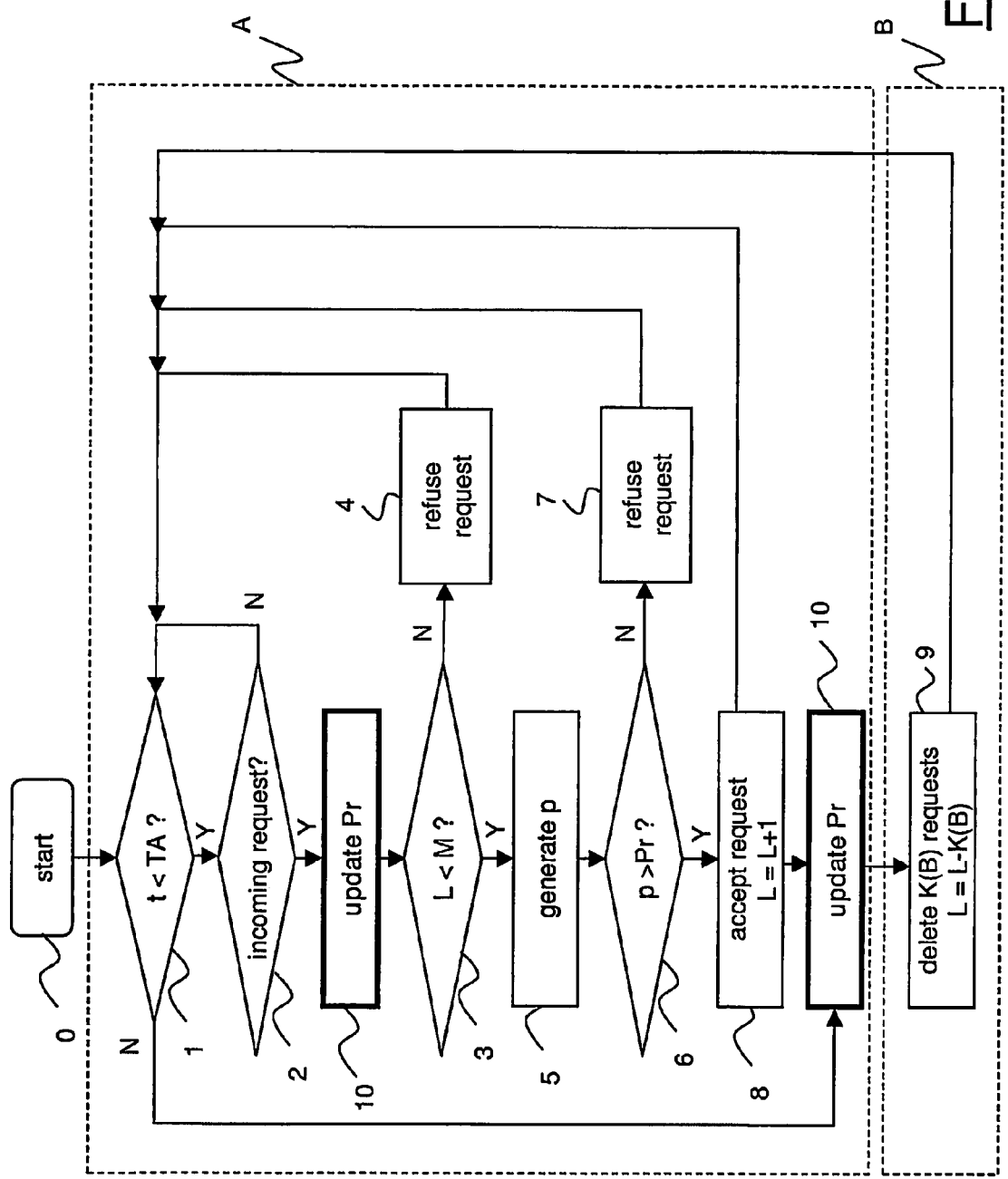
FIG. 5c shows a flow chart of the method according to a third embodiment of the present invention.

As mentioned above, according to the present invention, the estimation of the refusal probability Pr may be performed in different time instants. FIGS. 5a, 5b and 5c show flow charts of different embodiments of the present invention, wherein Pr is estimated in different instants.

In particular, FIG. 5a shows a flow chart of the first embodiment shown in FIG. 4a. In the flow chart of FIG. 5a, when a two-phase server enters allocation time frame A (step 0), firstly it compares (step 1) a time variable t, which is for instance generated by a timer, with a variable TA, which represents the duration of the allocation time frame A. Until t is lower than TA, the server keeps on executing the steps of the allocation time frame A. During the allocation time frame A, the server waits (step 2) for incoming requests from a plurality of users connected thereto. When a new incoming request arrives, the server checks (step 3) whether the buffer filling level L(t) is lower than the buffer storage capacity M. In the negative, the server refuses the request (step 4), as it is saturated. In the affirmative, the request is refused according to a refusal probability Pr. According to a preferred embodiment, for determining whether to accept or refuse the request, the server generates a random variable p (step 5). Preferably, the probability density function of random variable p is uniform within the range [0,1]. Then, p is compared with the estimated refusal probability Pr (step 6). If p is equal to or lower than Pr, the request is refused (step 7). Otherwise, the request is accepted, and the buffer filling level is updated (step 8). After a time TA has elapsed, the server estimates the new value of refusal probability Pr (step 10), which will be used during the next allocation time frame A. Then, the server enters de-allocation time frame B, wherein it deletes from the buffer (step 9) K(B) requests which have already been served. Then, the server updates the buffer filling level, and a next allocation time frame A starts.

FIG. 5b shows a flow chart of the second embodiment shown in FIG. 4b. It this case, the refusal probability Pr used during allocation time frame A is estimated at the beginning of the allocation time frame A itself. Thus, the refusal probability is estimated at the beginning of the time frame A (step 10), as shown by the flow chart of FIG. 5b. The various steps of the flow chart of FIG. 5b, as well as FIG. 5c hereinafter illustrated, are substantially as those of the flow chart of FIG. 5a, and are referenced by corresponding reference numbers. Thus, a detailed description of the single steps of the flow chart of FIGS. 5b and 5c will not be repeated.

FIGS. 5a and 5b show flow charts of embodiments of the present invention wherein the refusal probability Pr is constant for a whole allocation time frame, so that each incoming requests arriving during the same allocation time frame A are refused according to the same refusal probability. However, according to another embodiment of the present invention, the refusal probability Pr may be variable through an allocation time frame A. This means that not all the incoming requests arriving during a certain allocation time frame A are refused according to the same refusal probability.

For instance, FIG. 5c shows a third embodiment of the present invention, wherein the refusal probability Pr is updated, following the formula (I), not only at the instants teA0, teA1, teA2 . . . , as in the first embodiment, but also at any time t>tsA when a new request arrives at the server. In the latter case (the arrival of a new request), Pr is actually updated only if the Pr calculated at the instant t of arrival is higher than the current Pr. As the arrival of a new request implies a change of L"(t), and thus a change In the congestion state of the server, updating Pr any time L"(t) changes helps to follow substantially in real time the congestion state of the server. This helps to avoid more effectively the saturation of the buffer.

The invention claimed is:

1. A method of managing a congestion state in a server of a communication network, said server comprising a buffer storing a first number of service requests and having a maximum storage capacity, comprising:

in a first time frame, receiving a further service request to be stored in said buffer and determining whether to store such a further service request in said buffer or to refuse it; and in a second time frame, deleting a second number of service requests stored in the buffer, wherein determining whether to store said further service request in said buffer or to refuse it, comprises refusing said further request according to a refusal probability when said first number is lower than said maximum storage capacity, wherein determining whether to store said further service request in said buffer or to refuse it comprises generating a substantially random variable having a substantially uniform probability density within a range and comparing said substantially random variable with said refusal probability.

2. The method according to claim 1, wherein said refusal probability is calculated at a predetermined instant of either said first time frame or said second time frame.

3. The method according to claim 2, wherein said refusal probability is calculated at a starting instant of said first time frame.

4. The method according to claim 2, wherein said refusal probability is calculated at an end instant of said first time frame.

5. The method according to claim 1, wherein said refusal probability is kept constant through the first time frame.

6. The method according to claim 1, wherein said refusal probability is calculated according to the following equation:

$$\frac{L''(t) - M}{L''(t) - L(tsA^*)}$$

if L"(t)−M is greater than or equal to zero and L"(t)−L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity and L(tsA*) is the filling level of the buffer estimated at the beginning of said first time frame.

7. The method according to claim 1, wherein said refusal probability is calculated according to the following equation:

$$\frac{L''(t) - M + L(t) - L(tsA^*)}{L''(t) - L(tsA^*)}$$

if L"(t)−M+L(t)−L(tsA*) is greater than or equal to zero and L"(t)−L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity, and L(t) is the filling level of the buffer and L(tsA*) is the filling level of the buffer estimated at the beginning of said first time frame.

8. The method according to claim 1, wherein a further refusal probability is calculated upon receiving a further service request.

9. The method according to claim 8, wherein said further service request is refused according to said further refusal probability if said further refusal probability is higher than said refusal probability.

10. The method according to claim 8, wherein said further refusal probability is calculated according to the following equation:

$$\frac{L''(t) - M}{L''(t) - L(tsA^*)}$$

if L"(t)–M is greater than or equal to zero and L"(t)–L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity and L(tsA*) is the filling level of the buffer estimated at the beginning of said first time frame.

11. The method according to claim 8, wherein said further refusal probability is calculated according to the following equation:

$$\frac{L''(t) - M + L(t) - L(tsA^*)}{L''(t) - L(tsA^*)}$$

if L"(t)–M+L(t)–L(tsA*) is greater than or equal to zero and L"(t)–L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity, L(t) is the filling level of the buffer and L(tsA*) is the filling level of the buffer estimated at the beginning of said first time frame.

12. A server of a communication network, comprising:
a buffer storing a first number of service requests and having a maximum storage capacity, said server being adapted to:
in a first time frame, receive a further service request to be stored in said buffer and determine whether to store such a further service request in said buffer or to refuse it, and
in a second time frame, delete a second number of service requests stored in the buffer, wherein the server is also adapted to store said further service request in said buffer or to refuse it according to a refusal probability when said first number is lower than said maximum storage capacity; and
an adaptation to generate a substantially random variable having a substantially uniform probability density within a range and to compare said substantially random variable with said refusal probability.

13. The server according to claim 12, wherein said refusal probability is calculated at a predetermined instant of either said first time frame or said second time frame.

14. The server according to claim 12, wherein said refusal probability is calculated at a starting instant of said first time frame.

15. The server according to claim 12, wherein said refusal probability is calculated at an end instant of said first time frame.

16. The server according to claim 12, wherein said refusal probability is kept constant through the first time frame.

17. The server according to claim 12, wherein said refusal probability is calculated according to the following equation:

$$\frac{L''(t) - M}{L''(t) - L(tsA^*)}$$

if L"(t)–M is greater than or equal to zero and L"(t)–L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity and L(tsA*) is the filling level of the buffer estimated at the beginning of said first time frame.

18. The server according to claim 12, wherein said refusal probability is calculated according to the following equation:

$$\frac{L''(t) - M + L(t) - L(tsA^*)}{L''(t) - L(tsA^*)}$$

if L"(t)–M+L(t)–L(tsA*) is greater than or equal to zero and L"(t)–L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity, L(t) is the filling level of the buffer and L(tsA*) is the filling level of the buffer estimated at the beginning of said first time frame.

19. The server according to claim 12, wherein a further refusal probability is calculated upon receiving a further service request.

20. The server according to claim 19, wherein said further service request is refused according to said further refusal probability if said further refusal probability is higher than said refusal probability.

21. The server according to claim 19, wherein said further refusal probability is calculated according to the following equation:

$$\frac{L''(t) - M}{L''(t) - L(tsA^*)}$$

if L"(t)–M is greater than or equal to zero and L"(t)–L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity and L(tsA*) is the filling level of the buffer estimated at the beginning of said first time frame.

22. The server according to claim 19, wherein said further refusal probability is calculated according to the following equation:

$$\frac{L''(t) - M + L(t) - L(tsA^*)}{L''(t) - L(tsA^*)}$$

if L"(t)−M+L(t)−L(tsA*) is greater than or equal to zero and L"(t)−L(tsA*) is greater than zero, otherwise said refusal probability is set to zero, wherein L"(t) is the number of service requests that could be stored in said buffer if all the incoming requests were accepted and the buffer had unlimited storage capacity, M is the buffer storage capacity, L(t) is the filling level of the buffer and L(tsA*) is the filling level of the buffer estimated at the beginning of said first time frame.

23. The server according to claim 12, comprising a session initiation protocol proxy server.

24. A communication network comprising a server, the server comprising:
   a buffer storing a first number of service requests and having a maximum storage capacity, said server being adapted to:
   in a first time frame, receive a further service request to be stored in said buffer and determine whether to store such a further service request in said buffer or to refuse it, and
   in a second time frame, delete a second number of service requests stored in the buffer, wherein the server is also adapted to store said further service request in said buffer or to refuse it according to a refusal probability when said first number is lower than said maximum storage capacity; and
   an adaptation to generate a substantially random variable having a substantially uniform probability density within a range and to compare said substantially random variable with said refusal probability.

25. A computer readable storage medium encoded with a computer program product loadable into a memory of at least one computer, the computer program product comprising software code portions for performing a method of managing a congestion state in a server of a communication network, said server comprising a buffer storing a first number of service requests and having a maximum storage capacity, comprising:
   in a first time frame, receiving a further service request to be stored in said buffer and determining whether to store such a further service request in said buffer or to refuse it; and
   in a second time frame, deleting a second number of service requests stored in the buffer, wherein determining whether to store said further service request in said buffer or to refuse it, comprises refusing said further request according to a refusal probability when said first number is lower than said maximum storage capacity,
   wherein determining whether to store said further service request in said buffer or to refuse it comprises generating a substantially random variable having a substantially uniform probability density within a range and comparing said substantially random variable with said refusal probability.

* * * * *